(12) United States Patent
Himmelmann

(10) Patent No.: US 11,920,510 B2
(45) Date of Patent: Mar. 5, 2024

(54) INTERSTAGE ELECTRIC ALTERNATOR FOR MICRO-TURBINE ALTERNATOR APPLICATIONS

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 103 days.

(21) Appl. No.: 17/471,875

(22) Filed: Sep. 10, 2021

(65) Prior Publication Data
US 2023/0081167 A1 Mar. 16, 2023

(51) Int. Cl.
*F02C 3/045* (2006.01)
*F02B 33/40* (2006.01)
*H02K 1/22* (2006.01)

(52) U.S. Cl.
CPC .............. *F02B 33/40* (2013.01); *F02C 3/045* (2013.01); *H02K 1/223* (2013.01)

(58) Field of Classification Search
CPC .. F02B 33/40; F02C 3/045; F02C 3/05; F02C 3/107; H02K 1/223
See application file for complete search history.

(56) References Cited

U.S. PATENT DOCUMENTS

| | | | |
|---|---|---|---|
| 2,863,283 A * | 12/1958 | Schmider | F02C 7/26 60/39.24 |
| 6,296,441 B1 | 10/2001 | Gozdawa | |
| 6,369,478 B1 | 4/2002 | Koharagi et al. | |
| 7,055,306 B2 * | 6/2006 | Jones | F01D 5/022 60/262 |

(Continued)

FOREIGN PATENT DOCUMENTS

| | | |
|---|---|---|
| CN | 108386237 A | 8/2018 |
| EP | 2654185 A2 | 10/2013 |

(Continued)

OTHER PUBLICATIONS

European Search Report Issued in European Application No. 22190851.0-1004 dated Feb. 7, 2023; 6 Pages.

*Primary Examiner* — Steven M Sutherland
(74) *Attorney, Agent, or Firm* — CANTOR COLBURN LLP

(57) ABSTRACT

An electrical power generation system including a micro-turbine alternator including a combustion chamber, at least one turbine driven by combustion gases from the combustion chamber, a first stage compressor, and a second stage compressor located aft of the first stage compressor. The first stage compressor and the second stage compressor being operably connected to the combustion chamber to provide a compressed airflow thereto. The micro-turbine alternator including one or more shafts connecting the at least one turbine to the first stage compressor and the second stage compressor such that rotation of the at least one turbine (Continued)

drives rotation of the first and second stage compressor. An electric generator is disposed along the one or more shafts such that electrical power is generated via rotation of the one or more shafts. The electric generator is disposed along the one or more shafts between the first and second stage compressors.

20 Claims, 3 Drawing Sheets

(56) References Cited

U.S. PATENT DOCUMENTS

| | | | |
|---|---|---|---|
| 8,191,571 B2 | 6/2012 | Himmelmann et al. | |
| 9,149,865 B2 | 10/2015 | Smeets et al. | |
| 10,215,085 B2 * | 2/2019 | Yamashita | F04D 27/004 |
| 2009/0205362 A1 | 8/2009 | Haley | |
| 2017/0335756 A1 | 11/2017 | Donkin | |
| 2019/0145416 A1 | 5/2019 | Donato et al. | |
| 2021/0226509 A1 * | 7/2021 | Liu | F02C 6/20 |

FOREIGN PATENT DOCUMENTS

| | | | | |
|---|---|---|---|---|
| EP | 3205838 A1 * | 8/2017 | | F01D 19/02 |
| WO | WO-2013092279 A1 * | 6/2013 | | B64D 33/02 |

* cited by examiner

INTERSTAGE ELECTRIC ALTERNATOR FOR MICRO-TURBINE ALTERNATOR APPLICATIONS

BACKGROUND

The embodiments herein generally relate to electrical power generation systems and more specifically, to an interstage electric alternator for micro-turbine alternator applications.

Some systems, such as unmanned aerial vehicles (UAV's) or the like often utilize electrical power for propulsion and operation of onboard systems. Some such systems, such as medium-sized UAV's that require power levels in the range of about 1 KW to 30 KW, have relatively short mission times because the energy density of batteries is far too low to effectively work in this power range, and conventional internal combustion engines and jet engines are very inefficient at these low power levels. One option that has been developed is a tethered UAV system in which the UAV is connected to a power source on the ground by a tether. Use of a tethered UAV allows for an increase in mission duration time, but reduces an operating height and distance in which the UAV may operate, due to the constraint of the tether. An untethered power source that is lightweight with a high power density is greatly desired

BRIEF SUMMARY

According to one embodiment, an electrical power generation system is provided. The electrical power generation system including a micro-turbine alternator including a combustion chamber, at least one turbine driven by combustion gases from the combustion chamber, a first stage compressor, and a second stage compressor located aft of the first stage compressor. The first stage compressor and the second stage compressor being operably connected to the combustion chamber to provide a compressed airflow thereto. The micro-turbine alternator including one or more shafts connecting the at least one turbine to the first stage compressor and the second stage compressor such that rotation of the at least one turbine drives rotation of the first stage compressor and the second stage compressor and an electric generator disposed along the one or more shafts such that electrical power is generated via rotation of the one or more shafts. The electric generator is disposed along the one or more shafts between the first stage compressor and the second stage compressor.

In addition to one or more of the features described above, or as an alternative, further embodiments may include that at least one of the one or more shafts passes through the electric generator.

In addition to one or more of the features described above, or as an alternative, further embodiments may include that the electric generator is a permanent magnet alternator.

In addition to one or more of the features described above, or as an alternative, further embodiments may include that the electric generator further includes a stator element. The stator element includes a hub, a plurality of spokes extending radially inward from the hub, and one or more conductive elements that are wound around the spokes to form windings. The electric generator also includes a rotor element operably connected to and configured to rotate with the one or more shafts. The rotor element further includes an annular base member and an annular array of permanent magnets coupled to the annular base member.

In addition to one or more of the features described above, or as an alternative, further embodiments may include that the rotor element is located radially inward from the stator element.

In addition to one or more of the features described above, or as an alternative, further embodiments may include that the one or more shafts further includes a compressor shaft attached or operably connected to the first stage compressor, a turbine shaft attached or operably connected to the at least one turbine, and a coupling assembly operably connecting the turbine shaft to the compressor shaft.

In addition to one or more of the features described above, or as an alternative, further embodiments may include that the compressor shaft extends in an aft direction away from the first stage compressor and through the electric generator to operably connect to the coupling assembly.

In addition to one or more of the features described above, or as an alternative, further embodiments may include that the compressor shaft is located radially inward of the rotor element.

In addition to one or more of the features described above, or as an alternative, further embodiments may include that the micro-turbine alternator further includes an alternator stator cooling heat exchanger configured to utilize the compressed airflow from the first stage compressor to cool the electric generator.

In addition to one or more of the features described above, or as an alternative, further embodiments may include that the micro-turbine alternator further includes a third stage compressor located aft of the second stage compressor.

According to another embodiment, a vehicle is provided. The vehicle includes a propulsion system and an electrical power generation system operably connected to the propulsion system. The electrical power generation system includes a micro-turbine alternator. The micro-turbine alternator includes a combustion chamber, at least one turbine driven by combustion gases from the combustion chamber, a first stage compressor, and a second stage compressor located aft of the first stage compressor. The first stage compressor and the second stage compressor being operably connected to the combustion chamber to provide a compressed airflow thereto. The micro-turbine alternator also includes one or more shafts connecting the at least one turbine to the first stage compressor and the second stage compressor such that rotation of the at least one turbine drives rotation of the first stage compressor and the second stage compressor, and an electric generator disposed along the one or more shafts such that electrical power is generated via rotation of the one or more shafts. The electric generator is disposed along the one or more shafts between the first stage compressor and the second stage compressor.

In addition to one or more of the features described above, or as an alternative, further embodiments may include that at least one of the one or more shafts passes through the electric generator.

In addition to one or more of the features described above, or as an alternative, further embodiments may include that the electric generator is a permanent magnet alternator.

In addition to one or more of the features described above, or as an alternative, further embodiments may include that the electric generator further includes a stator element. The stator element includes a hub, a plurality of spokes extending radially inward from the hub, and one or more conductive elements that are wound around the spokes to form windings. The electric generator further includes a rotor element operable connected to and configured to rotate with the one or more shafts. The rotor element further includes an annular base member and an annular array of permanent magnets coupled to the annular base member.

In addition to one or more of the features described above, or as an alternative, further embodiments may include that the rotor element is located radially inward from the stator element.

In addition to one or more of the features described above, or as an alternative, further embodiments may include that the one or more shafts further include a compressor shaft attached or operably connected to the first stage compressor, a turbine shaft attached or operably connected to the at least one turbine, and a coupling assembly operably connecting the turbine shaft to the compressor shaft.

In addition to one or more of the features described above, or as an alternative, further embodiments may include that the compressor shaft extends in an aft direction away from the first stage compressor and through the electric generator to operably connect to the coupling assembly.

In addition to one or more of the features described above, or as an alternative, further embodiments may include that the compressor shaft is located radially inward of the rotor element.

In addition to one or more of the features described above, or as an alternative, further embodiments may include that the micro-turbine alternator further includes an alternator stator cooling heat exchanger configured to utilize the compressed airflow from the first stage compressor to cool the electric generator.

In addition to one or more of the features described above, or as an alternative, further embodiments may include that the vehicle is an unmanned aerial vehicle or an electrically-powered suit.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

As previously noted, an untethered, lightweight, high power density power source would allow systems like UAVs to have longer mission times without the height and distance limits of a tether. A prior approach to power generation involves micro-turbine alternator designs that places the electric generator at a forward end of a rotating shaft upstream of the compressor and turbine, which are then both located at an aft end of a rotating shaft. With this type of arrangement, the rotational speed of the compressor is limited by the compressor inlet relative velocity as the inlet diameter of the compress hub is increased to accommodate the rotating shaft that connects the compressor hub to the electric generator. Further, with this type of arrangement the compressor and turbine are overhung on the aft end of the rotating shaft, thus reducing the critical speed of the overall assembly. Embodiments disclosed herein relate to an inter-stage electric alternator for micro-turbine alternator applications. The micro-turbine alternator according to one or more embodiments may be used in a UAV or electrically-powered suit, as discussed for explanatory purposes, or any electrically-powered system. The design places an electric generator between two stages of the compressor to reduce the inlet diameter of the first stage compressor hub to as close to zero as possible so that the micro-turbine alternator may provide more power and operate with a lower inlet pressure.

Figure 1:
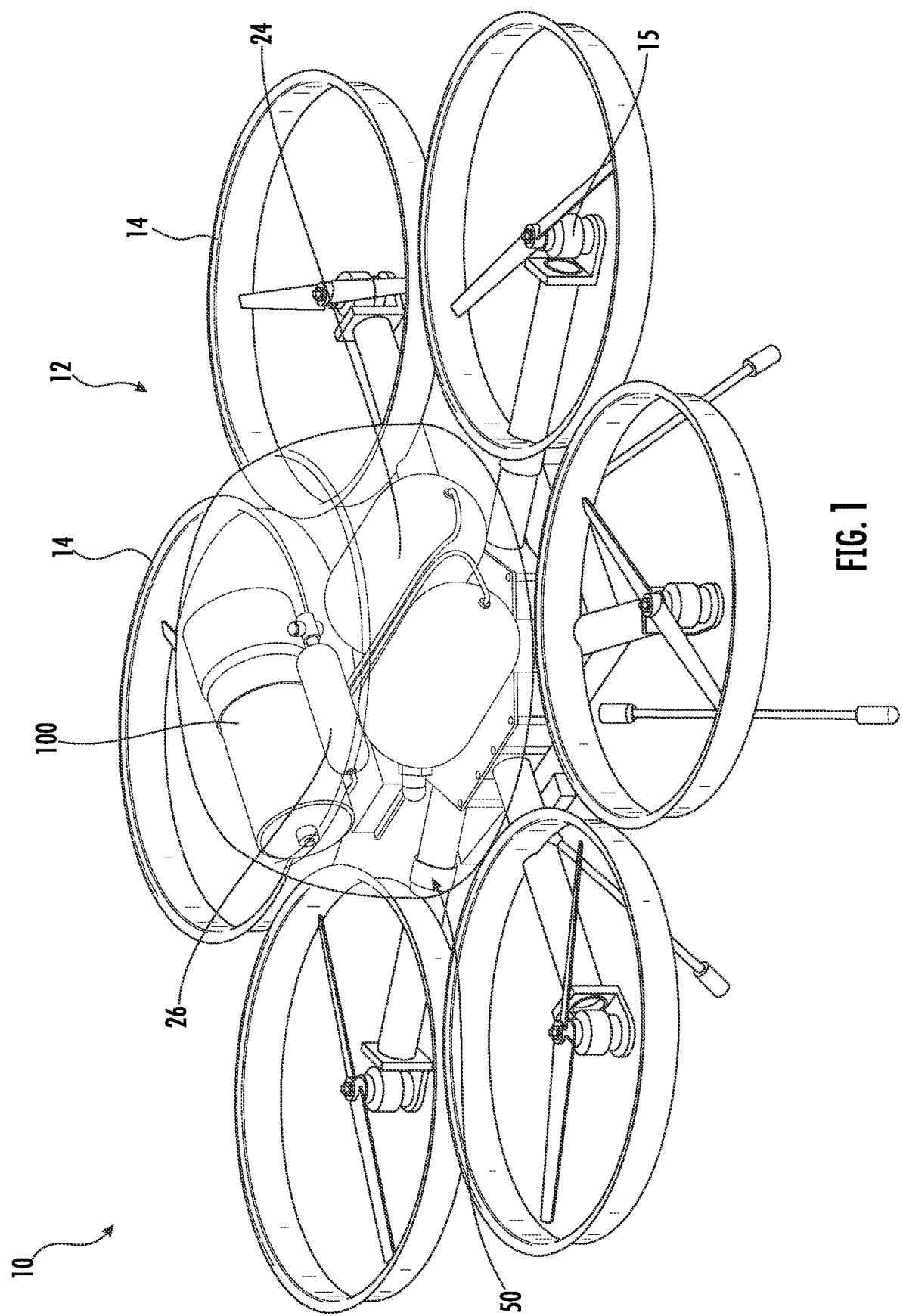
FIG. 1 is an isometric view of an unmanned aerial vehicle including a power generation system, according to an embodiment of the present disclosure.

Referring to FIG. 1, an isometric view of an unmanned aerial vehicle (UAV) 10 is illustrated in accordance with an embodiment of the present disclosure. The UAV 10 includes a propulsion/lift system 12, for example a plurality of lift rotors 14, operably connected to an electrical power generation system 50, which includes a micro-turbine alternator system 100. In an embodiment, the micro-turbine alternator system 100 is a high efficiency Brayton cycle micro-turbine alternator. The UAV 10 includes a propulsion system having electric motors 15 and lift rotors 14 associated with each electric motor 15. Each lift rotor 14 is operably connected to the electric motor 15 that is configured to rotate the lift rotor 14 using electrical power generated by the micro-turbine alternator system 100 of the electrical power generation system 50. The micro-turbine alternator system 100 is configured to convert fuel to electrical power to power at least the electric motors 15 of the lift rotors 14. The fuel is provided from one or more fuel storage tanks 24 operably connected to the micro-turbine alternator system 100. In some embodiments, the fuel utilized is JP-8. The micro-turbine alternator system 100 may utilize compressed air provided from a compressed air tank 26 at 4500 psig and regulated to about 750 psig. The compressed air from the compressed air tank 26 of FIG. 1 may be utilized to provide the motive pressure required to drive the liquid fuel through a turbine speed control valve (not shown) and into a combustion chamber. Alternatively, an electric driven pump may be used in place of the compressed air.

Figure 2:
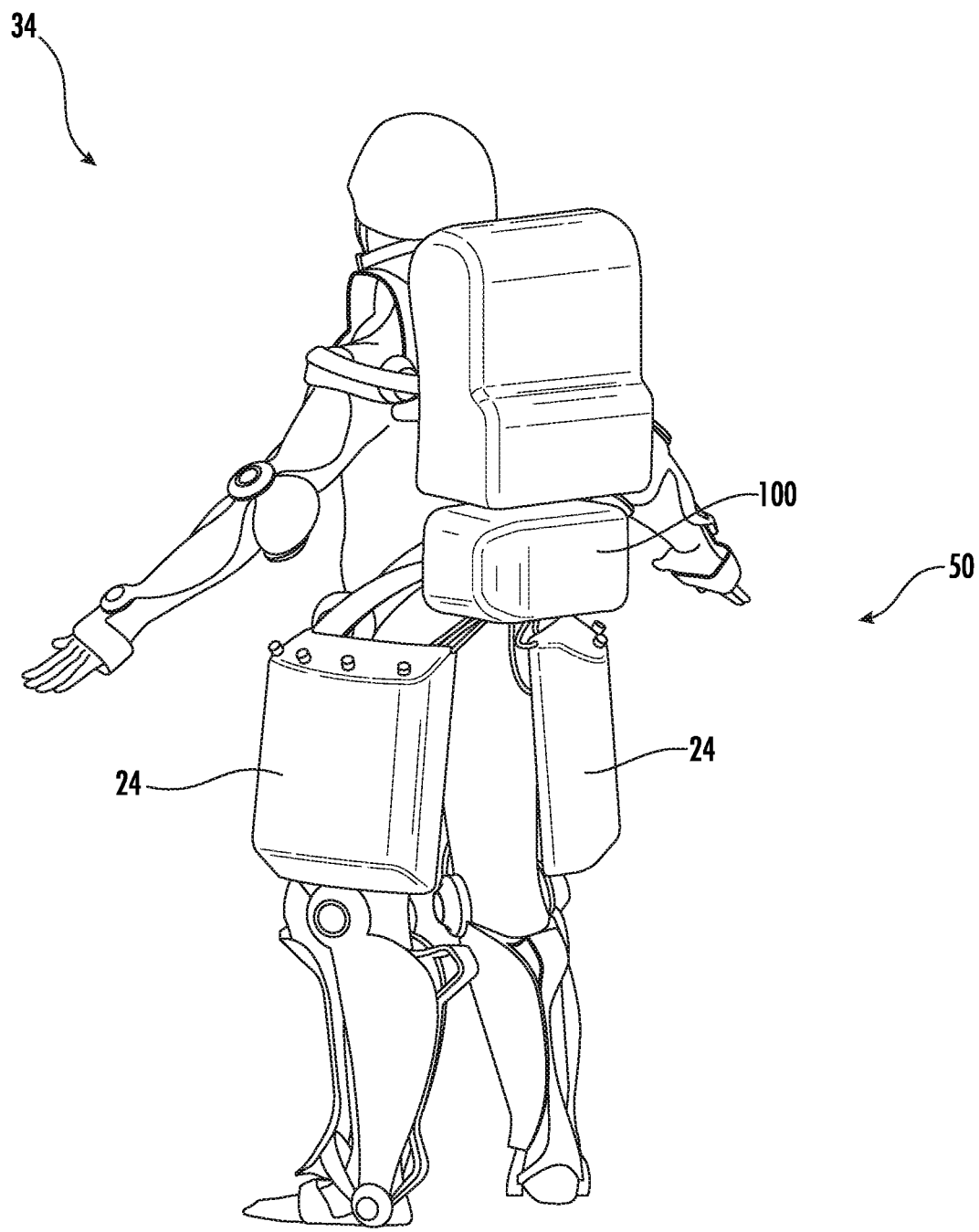
FIG. 2 is an isometric view of a powered suit including a power generation system, according to an embodiment of the present disclosure.

Referring now to FIG. 2, with continued reference to FIG. 1, an isometric view of an electrically-powered suit 34 is illustrated in accordance with an embodiment of the present disclosure. While in FIG. 1, the micro-turbine alternator system 100 is described as utilized in a UAV 10, the micro-turbine alternator system 100 disclosed herein may be readily applied to other systems, and may be utilized in, for example, an electrically-powered suit 34, as shown in FIG. 2.

The electrically-powered suit 34 is operably connected to an electrical power generation system 50, which includes a micro-turbine alternator system 100. The micro-turbine alternator system 100 is configured to convert fuel to electrical power to power the electrically-powered suit 34. The fuel is provided from one or more fuel storage tanks 24 operably connected to the micro-turbine alternator system 100. In some embodiments, the fuel utilized is JP-8. The fuel storage tanks 24 may be located on legs of the electrically-powered suit 34, as illustrated in FIG. 2.

It is understood that the micro-turbine alternator system 100 is not limited to a UAV 10 and an electrically-powered suit 34 application, and the micro-turbine alternator system 100 may be applied to other systems not disclosed herein.

Figure 3:
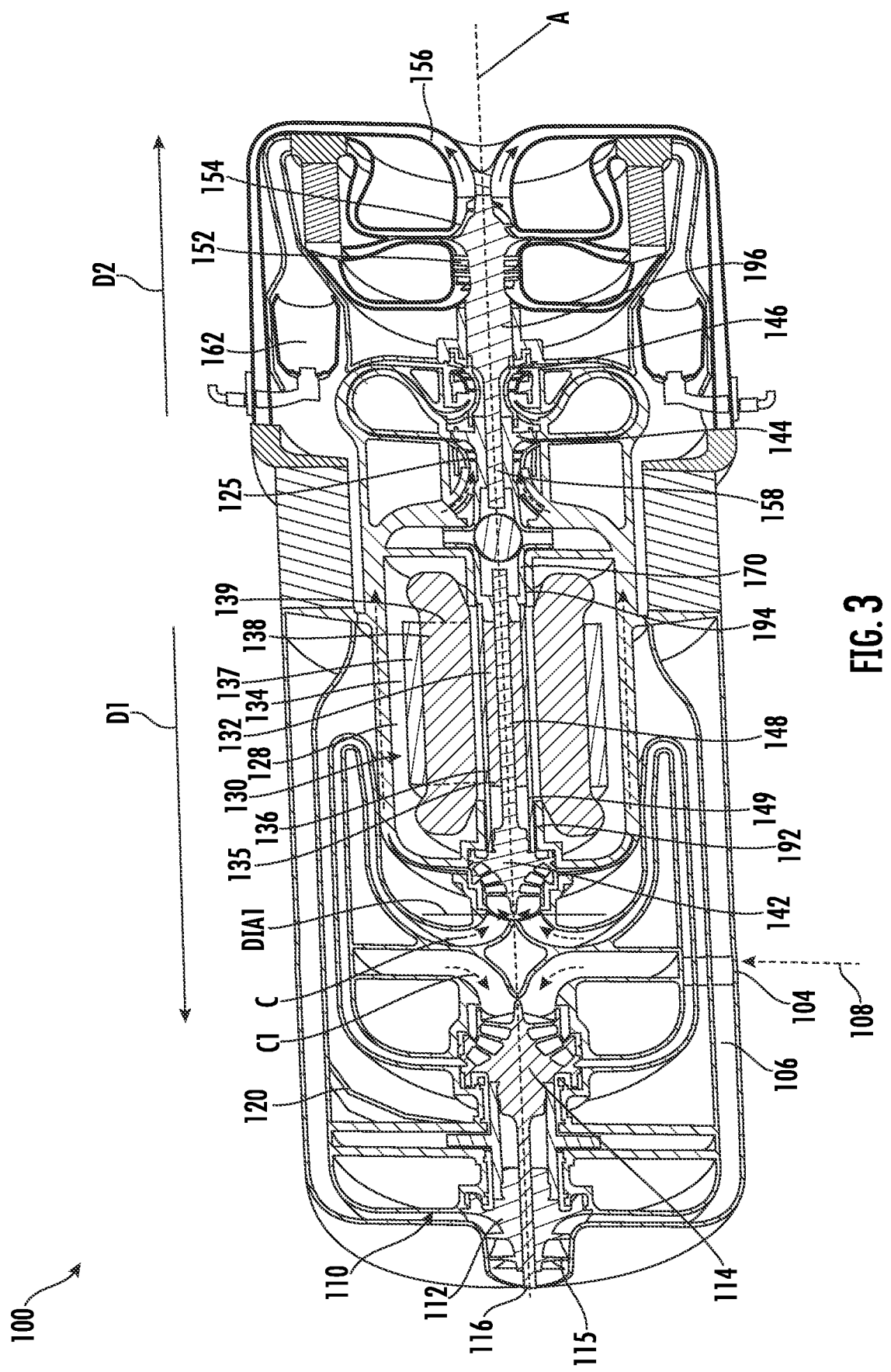
FIG. 3 is an isometric cut-away view of a micro-turbine alternator for use in the power generation system of FIGS. 1 and 2, according to an embodiment of the present disclosure.

Referring now to FIG. 3, an isometric cut-away view of the micro-turbine alternator system 100 is illustrated, in accordance with an embodiment of the present disclosure. The micro-turbine alternator system 100 includes a first stage compressor 142, a second stage compressor 144, a third stage compressor 146, a first stage turbine 152, and a second stage turbine 154. The first stage compressor 142, the second stage compressor 144, the third stage compressor 146, the first stage turbine 152, and the second stage turbine 154 are oriented along a central longitudinal axis A of the micro-turbine alternator system 100. The micro-turbine alternator system 100 also includes an electric generator 130 located between the first stage compressor 142 and the second stage compressor 144 as measured along the central longitudinal axis A.

Advantageously, by locating the electric generator 130 between the first stage compressor 142 and the second stage compressor 144, the overall physical size of the micro-turbine alternator system 100 is reduced. As a result, the micro-turbine alternator system 100 according to one or more embodiments may be used in a UAV 10, an electrically-powered suit 34, or another system that benefits from untethered, lightweight power generation.

The micro-turbine alternator system 100 also includes an alternator stator cooling heat exchanger 128 configured to utilize airflow from the first stage compressor 142 to cool the electric generator 130. The alternator stator cooling heat exchanger 128 may encircle or enclose the electric generator 130 and may be configured to pass airflow from the first stage compressor 142 through or around the electric generator 130. Advantageously, by locating the electric generator 130 between the first stage compressor 142 and the second stage compressor 144, moderately cool air in the core flow path C from the first stage compressors 142 is forced through the alternator stator cooling heat exchanger 128 and heat may be drawn out of the electric generator 130 and to the airflow within the alternator stator cooling heat exchanger 128.

The electric generator 130 may be a permanent magnet alternator, an induction generator, a switched reluctance generator, a wound field generator, a hybrid generator, or any other type of alternator known to one of skill in the art. As illustrated in FIG. 3, the electric generator 130 may be a permanent magnet alternator that includes a rotor element 132 and a stator element 134 radially outward from the rotor element. In other words, the rotor element 132 is located radially inward from the stator element 134 as measured relative to the central longitudinal axis A. It is understood that the embodiments disclosed herein may be applicable to a rotor element 132 that is located radially outward from the stator element 134. The rotor element 132 may be rotated around the central longitudinal axis A to generate electricity.

The rotor element 132 includes an annular base member 135, an annular array of permanent magnets 136 that are respectively coupled to an outer diameter of the annular base member 135. The rotor element 132 may include a magnet retention band that fits over an outer diameter of the permanent magnet 136, and keeps the permanent magnet 136 on the rotating annular base member 135. In accordance with further embodiments, the stator element 134 includes a hub 137, a plurality of spokes 139 extending radially inward from the hub 137 and conductive elements 138 that are wound around the spokes 139 to form windings. When the rotor element 132 is rotated around the central longitudinal axis A a rotating flux field is generated by the permanent magnets 136 and this rotating flux field generates an alternating current in the conductive elements 138 to generate electricity for use by the UAV 10 of FIG. 1 or the electrically-powered suit 34 of FIG. 2.

The micro-turbine alternator system 100 includes a combustion chamber 162, in which a fuel-air mixture is combusted, with the combustion products utilized to drive an electric generator 130. In some embodiments, the fuel utilized in the combustion chamber 162 is JP-8. The micro-turbine alternator system 100 converts the energy of the combustion products into electrical power by urging the combustion products through the first stage turbine 152 and the second stage turbine 154, which are operably connected to and configured to rotate the rotor element 132 of the electric generator 130. The electrical energy generated by the electric generator 130 may then be rectified via a generator rectifier (not shown) and utilized by the propulsion/lift system 12 of FIG. 1 or the electrically-powered suit 34 of FIG. 2. The compressed air from the compressed air tank 26 of FIG. 1 may be utilized to provide the motive pressure required to drive the liquid fuel through a turbine speed control valve (not shown) and into the combustion chamber 162.

The first stage compressor 142 is located forward of the second stage compressor 144 and the third stage compressor 146 as measured along the central longitudinal axis A, and the second stage compressor 144 is located forward of the third stage compressor 146 as measured along the central longitudinal axis A. In other words, the second stage compressor 144 is located aft of the first stage compressor 142 and the third stage compressor 146 is located aft of the second stage compressor 144 as measured along the central longitudinal axis A. The forward direction D1 and the aft direction D2 are illustrated in FIG. 3. The first stage turbine 152 is located forward of the second stage turbine 154 as measured along the central longitudinal axis A. In other words, the second stage turbine 154 is located aft of the first stage turbine 152 as measured along the central longitudinal axis A. The first stage compressor 142, the second stage compressor 144, and the third stage compressor 146 are located forward of first stage turbine 152 and the second stage turbine 154 as measured along the central longitudinal axis A.

The micro-turbine alternator system 100 includes a compressor shaft 148 oriented along and co-axial to the central longitudinal axis A. In an embodiment, the compressor shaft 148 is a tie bolt and is used to compress a rotating group of components including the first stage compressor 142, compressor transfer tube 149, the compressor shaft 148, and a second journal bearing 194 in the axial direction, causing the multi-segment shaft to act as a single stiff shaft. The compressor shaft 148 may be attached or operably connected to the first stage compressor 142. The micro-turbine alternator system 100 includes a turbine shaft 158 oriented along and co-axial to the central longitudinal axis A. The turbine shaft 158 may be attached or operably connected to the first stage turbine 152 and the second stage turbine 154.

The micro-turbine alternator system 100 includes a coupling assembly 170 configured to operably connect the turbine shaft 158 to the compressor shaft 148. The coupling assembly 170 may be attached or operably connected to the second stage compressor 144. The compressor shaft 148 extends in the aft direction D2 away from the first stage compressor 142 and through the electric generator 130 to operably connect to the coupling assembly 170. In an embodiment, the compressor shaft 148 is located radially inward of the rotor element 132.

Advantageously, locating the electric generator 130 between the first stage compressor 142 and the second stage compressor 144 allows the first stage compressor 142 to have a reduced inlet hub diameter that is smaller than a diameter of the rotor element 132. Having a reduced inlet hub diameter DIA1 reduces the inlet flow relative velocity, increasing the aerodynamic performance of the first stage compressor 142 and increasing the swallowing capacity of the first stage compressor 142. If the electric generator 130 was located forward of the first stage compressor 142, then the compressor shaft 148 would have to extend forward of the first stage compressor 142 and thus the inlet hub diameter DIA1 would have to be increased to a diameter of the compressor shaft 148, thus decreasing the aerodynamic performance of the first stage compressor 142 and decreasing the swallowing capacity of the first stage compressor 142.

The turbine shaft 158 extends in the forward direction D1 away from the first stage turbine 152 to operably connect to the coupling assembly 170. The turbine shaft 158, the coupling assembly 170, and the compressor shaft 148 are configured to rotate in unison. Thus, when exhaust 102 from the combustion chamber 162 drives rotation of the first stage turbine 152 and the second stage turbine 154, the rotation of the first stage turbine 152 and the second stage turbine 154 drives rotation of the turbine shaft 158, which drives rotation of the coupling assembly 170 and the compressor shaft 148. The rotation of the compressor shaft 148 drives rotation of the first stage compressor 142. The rotation of the coupling assembly 170 drives rotation of the second stage compressor 144. The third stage compressor 146 is operably connected to the second stage compressor 144 and the turbine shaft 158, and thus rotation of the second stage compressor 144 and the turbine shaft 158 drives rotation of the third stage compressor 146.

It is understood that while the compressor shaft 148, the turbine shaft 158, and the coupling assembly 170 are described as three different shafts, the embodiments disclosed herein may be applicable to micro-turbine alternator system 100 having one or more shafts. In an embodiment, the electric generator 130 is disposed along the one or more shafts between the first stage compressor 142 and the second stage compressor 144. In another embodiment, the electric generator 130 is disposed along the compressor shaft 148 between the first stage compressor 142 and the second stage compressor 144. The electric generator 130 is located aft of the first stage compressor 142 and forward of the second stage compressor 144. In another embodiment, at least one of the one or more drive shafts passes through the electric generator 130. In another embodiment, the compressor shaft 148 passes through the electric generator 130.

The compressor shaft 148, the turbine shaft 158, and the coupling assembly 170 are coaxial and rotate via the bearing systems about the engine centerline longitudinal axis A, which is co-linear with their longitudinal axes. The bearing system includes a first journal bearing 192 located between the compressor transfer tube 149 and the frame 106 of the micro-turbine alternator system 100. The bearing system includes a second journal bearing 194 located between the coupling assembly 170 and the frame 106 of the micro-turbine alternator system 100. The bearing system includes a third journal bearing 196 located between the turbine shaft 158 and the frame 106 of the micro-turbine alternator system 100.

Advantageously, locating the electric generator 130 between the first stage compressor 142 and the second stage compressor 144 provides for very effective bearing placement around the compressor shaft 148, which increases the stiffness of the compressor shaft 148. The increased stiffness of the compressor shaft 148 allows for an increase in the critical speed of the compressor shaft 148.

Also, advantageously, by locating the electric generator 130 between the first stage compressor 142 and the second stage compressor 144, the alternator stator cooling heat exchanger 128 helps reduce the operating temperature of the electric generator 130, while the airflow through the alternator stator cooling heat exchanger 128 also experiences a pressure drop. This pressure drop through the alternator stator cooling heat exchanger 128 forces some of the airflow from the first stage compressor 142 through the rotor element 132 and to a stator gap between the rotor element 132 and the stator element 134, which provides cooling air to the rotor element 132, the first journal bearing 192, and the second journal bearing 194.

The compressor transfer tube 149 extends from the first stage compressor 142 to the second stage compressor 144 through the electric generator 130. The compressor transfer tube 149 is co-axial with the electric generator 130. The rotor element 132 with the annular base member 135 and the annular array of permanent magnets 136 are located radially inward of the compressor transfer tube 149 measured relative to the central longitudinal axis A. The stator element 134 with the hub 137, the conductive elements 138, and the spokes 139 are located radially outward of the compressor transfer tube 149 measured relative to the central longitudinal axis A.

The first stage compressor 142, the second stage compressor 144, and the third stage compressor 146 drive air along a core flow path C for compression and communication in the combustion chamber 162. The airflow in the core flow path C is compressed by the first stage compressor 142, the second stage compressor 144, and the third stage compressor 146, is mixed with fuel and burned in the combustion chamber 162, and is then expanded over the first stage turbine 152 and the second stage turbine 154. The first stage turbine 152 and the second stage turbine 154 rotationally drive the turbine shaft 158 in response to the expansion. The combustion products are exhausted from the second stage turbine 154 through a turbine exit 156.

Each of the first stage compressor 142, the second stage compressor 144, the third stage compressor 146, the first stage turbine 152, and the second stage turbine 154 may include rows of rotor assemblies (shown schematically) that carry airfoils that extend into the core flow path C. For example, the rotor assemblies can carry a plurality of rotating blades 125. The blades 125 of the rotor assemblies create or extract energy (in the form of pressure) from the core airflow that is communicated through the micro-turbine alternator system 100 along the core flow path C.

The micro-turbine alternator system 100 may include an auxiliary turbo charger 110 to pre-compress the airflow 108 prior to entering the core flow path C. The auxiliary turbo charger 110 includes a compressor 114 and a turbine 112 operably connected to the compressor 114 through a turbo compressor drive shaft 116. The compressor 114 is configured to rotate when the turbine 112 rotates.

The compressor 114 is configured to pull external airflow 108 through one or more air inlets 104 in the frame 106 into a compressor flow path Cl. The compressor 114 is configured to compress the external airflow 108 in the compressor flow path Cl and deliver the airflow 108 to the first stage compressor 142 in the core airflow path C.

Each of the turbine 112 and the compressor 114 may include rows of rotor assemblies (shown schematically) that carry airfoils that extend into the compressor flow path Cl. For example, the rotor assemblies can carry a plurality of rotating blades 115. The blades 115 of the rotor assemblies for the turbine 112 extract energy (in the form of pressure and temperature) from the exhaust 102 that is communicated through the micro-turbine alternator system 100 along the core flow path C. The blades 115 of the rotor assemblies for the compressor 114 create energy (in the form of pressure and temperature) from the airflow 108 that is communicated through the micro-turbine alternator system 100 along the compressor flow path Cl.

Combustor exhaust 102 exiting the turbine exit 156 is directed to the turbine 112 of the auxiliary turbo charger 110. The exhaust 102 is then expanded over the turbine 112 of the auxiliary turbo charger 110. The turbine 112 rotationally drives the turbo compressor drive shaft 116 in response to the expansion. Rotation of the turbo compressor drive shaft 116 causes the compressor 114 to rotate and compress the airflow 108 within the compressor flow path Cl.

Some embodiments further include a thermal electric energy recovery system 120, configured to recover additional energy from exhaust 102 of the micro-turbine alternator system 100 before the exhaust 102 has flowed through the turbine 112 of the auxiliary turbo charger 120.

Technical effects and benefits of the features described herein include an electric generator located between two stages of a compressor to reduce the inlet diameter of the compressor hub as close to zero as possible so that the micro-turbine alternator could provide more power and operate with a lower inlet pressure.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electrical power generation system, comprising:
   one or more fuel storage tanks configured to store a fuel;
   one or more compressed air tanks connected to utilize compressed air to provide a motive pressure to drive liquid fuel from the one or more fuel storage tanks through a turbine speed control valve within a micro-turbine alternator;
   the micro-turbine alternator being configured to convert the fuel to electric power, and comprising:
   a combustion chamber;
   at least one turbine driven by combustion gases from the combustion chamber;
   a first stage compressor;
   a second stage compressor located aft of the first stage compressor, the first stage compressor and the second stage compressor being operably connected to the combustion chamber to provide a compressed airflow thereto;
   one or more shafts connecting the at least one turbine to the first stage compressor and the second stage compressor such that rotation of the at least one turbine drives rotation of the first stage compressor and the second stage compressor, the one or more shafts including a compressor shaft attached or operably connected to the first stage compressor, a turbine shaft attached or operably connected to the at least one turbine, and a coupling assembly operably connecting the turbine shaft to the compressor shaft, and wherein an inlet hub of the micro-turbine alternator has a diameter less at a forward edge of the first stage compressor than a diameter of the compressor shaft;
   an electric generator disposed along the one or more shafts such that electrical power is generated via rotation of the one or more shafts, wherein the electric generator is disposed along the one or more shafts between the first stage compressor and the second stage compressor.

2. The electrical power generation system of claim 1, wherein at least one of the one or more shafts passes through the electric generator.

3. The electrical power generation system of claim 2, wherein the electric generator is a permanent magnet alternator.

4. The electrical power generation system of claim 3, wherein the electric generator further comprises:
   a stator element, the stator element comprising:
   a hub;
   a plurality of spokes extending radially inward from the hub; and
   one or more conductive elements that are wound around the plurality of spokes to form windings; and
   a rotor element operably connected to and configured to rotate with the one or more shafts, the rotor element further comprising:
   an annular base member; and
   an annular array of permanent magnets coupled to the annular base member.

5. The electrical power generation system of claim 4, wherein the rotor element is located radially inward from the stator element.

6. The electrical power generation system of claim 5, wherein the compressor shaft extends in an aft direction away from the first stage compressor and through the electric generator to operably connect to the coupling assembly.

7. The electrical power generation system of claim 6, wherein the compressor shaft is located radially inward of the rotor element.

8. The electrical power generation system of claim 1, wherein the micro-turbine alternator further comprises an alternator stator cooling heat exchanger configured to utilize the compressed airflow from the first stage compressor to cool the electric generator.

9. The electrical power generation system of claim 8, wherein the alternator stator cooling heat exchanger is configured to pass the compressed airflow from the first stage compressor through the electric generator.

10. The electrical power generation system of claim 1, wherein the micro-turbine alternator further comprises a third stage compressor located aft of the second stage compressor.

11. A vehicle, comprising:
a propulsion system; and
an electrical power generation system operably connected to the propulsion system, comprising:
one or more fuel storage tanks configured to store a fuel;
one or more compressed air tanks connected to utilize compressed air to provide a motive pressure to drive liquid fuel from the one or more fuel storage tanks through a turbine speed control valve within a micro-turbine alternator;
the micro-turbine alternator, comprising:
a combustion chamber;
at least one turbine driven by combustion gases from the combustion chamber;
a first stage compressor;
a second stage compressor located aft of the first stage compressor, the first stage compressor and the second stage compressor being operably connected to the combustion chamber to provide a compressed airflow thereto;
one or more shafts connecting the at least one turbine to the first stage compressor and the second stage compressor such that rotation of the at least one turbine drives rotation of the first stage compressor and the second stage compressor, the one or more shafts including a compressor shaft attached or operably connected to the first stage compressor, a turbine shaft attached or operably connected to the at least one turbine, and a coupling assembly operably connecting the turbine shaft to the compressor shaft, and wherein an inlet hub of the micro-turbine alternator has a diameter at a forward edge of the first stage compressor less than a diameter of the compressor shaft; and
an electric generator disposed along the one or more shafts such that electrical power is generated via rotation of the one or more shafts, wherein the electric generator is disposed along the one or more shafts between the first stage compressor and the second stage compressor.

12. The vehicle of claim 11, wherein at least one of the one or more shafts passes through the electric generator.

13. The vehicle of claim 12, wherein the electric generator is a permanent magnet alternator.

14. The vehicle of claim 13, wherein the electric generator further comprises:
a stator element, the stator element comprising:
a hub;
a plurality of spokes extending radially inward from the hub; and
one or more conductive elements that are wound around the plurality of spokes to form windings; and
a rotor element operable connected to and configured to rotate with the one or more shafts, the rotor element further comprising:
an annular base member; and
an annular array of permanent magnets coupled to the annular base member.

15. The vehicle of claim 14, wherein the rotor element is located radially inward from the stator element.

16. The vehicle of claim 15, wherein the compressor shaft extends in an aft direction away from the first stage compressor and through the electric generator to operably connect to the coupling assembly.

17. The vehicle of claim 16, wherein the compressor shaft is located radially inward of the rotor element.

18. The vehicle of claim 11, wherein the micro-turbine alternator further comprises an alternator stator cooling heat exchanger configured to utilize the compressed airflow from the first stage compressor to cool the electric generator.

19. The vehicle of claim 18, wherein the alternator stator cooling heat exchanger is configured to pass the compressed airflow from the first stage compressor through the electric generator.

20. The vehicle of claim 11, wherein the vehicle is an electrically-powered suit.

* * * * *